(12) United States Patent
Morita et al.

(10) Patent No.: US 12,475,891 B2
(45) Date of Patent: Nov. 18, 2025

(54) INFORMATION PROCESSING DEVICE AND INFORMATION PROCESSING METHOD

(71) Applicant: Nissan Motor Co., Ltd., Yokohama (JP)

(72) Inventors: Yusuke Morita, Kanagawa (JP); Tomokazu Furuya, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 276 days.

(21) Appl. No.: 18/030,382

(22) PCT Filed: Oct. 22, 2020

(86) PCT No.: PCT/IB2020/000891
§ 371 (c)(1),
(2) Date: Apr. 5, 2023

(87) PCT Pub. No.: WO2022/084708
PCT Pub. Date: Apr. 28, 2022

(65) Prior Publication Data
US 2023/0377578 A1 Nov. 23, 2023

(51) Int. Cl.
G10L 15/25 (2013.01)
B60K 35/10 (2024.01)
(Continued)

(52) U.S. Cl.
CPC .............. *G10L 15/25* (2013.01); *B60K 35/10* (2024.01); *B60K 35/60* (2024.01); *B60K 35/80* (2024.01);
(Continued)

(58) Field of Classification Search
CPC ...... B60K 2360/1464; B60K 2360/149; B60K 35/10; B60K 35/60; B60K 35/80;
(Continued)

(56) References Cited

U.S. PATENT DOCUMENTS 9,823,742 B2 * 11/2017 Parker .................... G06F 3/013
2016/0373269 A1 * 12/2016 Okubo .................. H04L 12/282

FOREIGN PATENT DOCUMENTS

CN 104838335 A 8/2015
CN 105009032 A 10/2015
(Continued)

OTHER PUBLICATIONS

Office Action of Jan. 27, 2025 of corresponding Chinese Patent Application No. 202080105925.6.
(Continued)

*Primary Examiner* — Angela A Armstrong
(74) *Attorney, Agent, or Firm* — GLOBAL IP COUNSELORS, LLP

(57) ABSTRACT

An information processing device and an information processing method each stores line-of-sight data pertaining to a user's line of sight direction of acquired by a line-of-sight-data-receiving unit, and specifies a target apparatus to be operated based on the line-of-sight data when the voice data was acquired and the target apparatus to be operated cannot be specified based on the voice data. A control command is generated that is directed at the target apparatus to be operated based on the voice data, and the target apparatus to be operated is controlled.

14 Claims, 2 Drawing Sheets

(51) Int. Cl.
    *B60K 35/60*     (2024.01)
    *B60K 35/80*     (2024.01)
    *G06F 3/01*     (2006.01)
    *G06F 3/04845*     (2022.01)
    *G10L 15/22*     (2006.01)

(52) U.S. Cl.
    CPC .......... *G06F 3/013* (2013.01); *G06F 3/04845* (2013.01); *G10L 15/22* (2013.01); *G10L 2015/223* (2013.01)

(58) Field of Classification Search
    CPc ..... B60R 16/0373; G10L 15/22; G10L 15/25; G10L 2015/223; G06F 3/013; G06F 3/04845; G06F 3/167
    See application file for complete search history.

(56) References Cited

FOREIGN PATENT DOCUMENTS

| | | |
|---|---|---|
| CN | 106257355 A | 12/2016 |
| JP | 2017-159692 A | 9/2017 |
| WO | 2019/142295 A1 | 7/2019 |

OTHER PUBLICATIONS

Second Office Action received for Chinese Application No. 202080105925.6, issued on May 31, 2025, 8 pages.

\* cited by examiner

INFORMATION PROCESSING DEVICE AND INFORMATION PROCESSING METHOD

CROSS-REFERENCE TO RELATED APPLICATIONS

This application is a U.S. national stage application of International Application No. PCT/IB2020/000891, filed on Oct. 22, 2020.

BACKGROUND

Technical Field

The present invention relates to an information processing device and an information processing method.

Background Information

Devices are known in which the voice of a driver of a vehicle is recognized, one onboard apparatus is designated based on the recognition result as an apparatus to be operated, permission to accept input to operate the apparatus to be operated is granted, driver-controlled commands are recognized, and the control commands are transmitted to the apparatus to be operated. For example, a known device is disclosed in Japanese Patent Application Publication No. 2017-159692 A (Patent Document 1).

SUMMARY

In the invention disclosed in Patent Document 1, an apparatus to be operated is specified based on the result of recognizing the voice of a driver, and a problem is presented in that an operation might be performed incorrectly when a unique apparatus to be operated cannot be specified.

The present invention was devised in view of the above problem, it being an object of the invention to provide an information processing device and an information processing method with which it is possible to specify a unique apparatus to be operated and to reduce the possibility that the apparatus will be operated incorrectly.

In an information processing device and information processing method according to one aspect of the present invention, line-of-sight data pertaining to the direction of a user's line of sight is stored, and when voice data has been acquired, a target apparatus to be operated is specified from a plurality of apparatuses based on the stored line-of-sight data, a control command directed at the target apparatus to be operated is generated based on the voice data, and the target apparatus to be operated is controlled.

According to the present invention, a unique apparatus to be operated is specified and the possibility that the apparatus will be operated incorrectly can be reduced.

BRIEF DESCRIPTION OF THE DRAWINGS

Referring now to the attached drawings which form a part of this original disclosure.

DETAILED DESCRIPTION

An embodiment of the present invention is described below with reference to the drawings. The same symbols are used to denote the same components in the descriptions of the drawings, and redundant explanations are omitted.

Configuration of Information Processing Device

Figure 1:
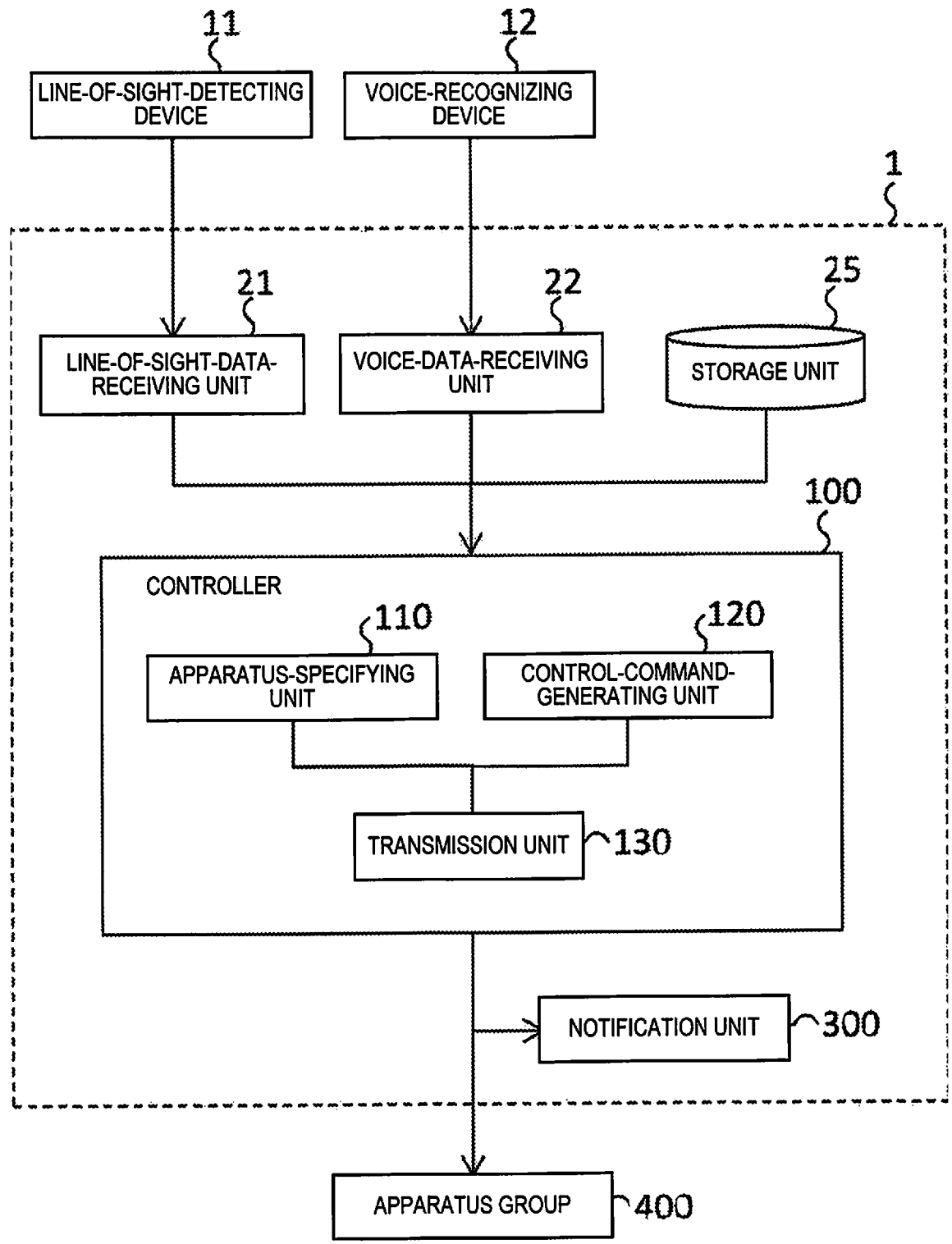
FIG. 1 is a block diagram of the configuration of an information processing device according to one embodiment of the present invention.

A configuration example of an information processing device 1 according to the present embodiment is described with reference to FIG. 1. As one example, the information processing device 1 is installed in a vehicle. The information processing device 1 includes a line-of-sight-data-receiving unit 21, a voice-data-receiving unit 22, and a controller 100, as shown in FIG. 1. In addition, the information processing device 1 can include a storage unit 25 and a notification unit 300.

The line-of-sight-data-receiving unit 21 is connected to a line-of-sight-detecting device 11 and the controller 100, and acquires (or receives) line-of-sight data pertaining to the line-of-sight direction of a user from the line-of-sight-detecting device 11. For example, the user is an occupant riding in the vehicle. The line-of-sight-detecting device 11 performs a recognition process, such as, for example, feature value calculation and shape discrimination using the user's face and eyeballs as objects to be detected, on image data inputted from a camera (not shown), and calculates the direction (vector) of the user's line-of-sight based on the recognized objects to be detected.

Line-of-sight data including information pertaining to the line-of-sight direction calculated by the line-of-sight-detecting device 11 is inputted to the line-of-sight-data-receiving unit 21. The line-of-sight data can include information such as the time at which the user is looking in the line-of-sight direction, the frequency with which the user looks in the line-of-sight direction, and the time span during which the user is looking in the line-of-sight direction.

The line-of-sight-data-receiving unit 21 transmits the line-of-sight data acquired from the line-of-sight-detecting device 11 to the controller 100. In addition, the line-of-sight-data-receiving unit 21 can transmit the acquired line-of-sight data to the storage unit 25 (described hereinafter).

The voice-data-receiving unit 22 is connected to a voice-recognizing device 12 and the controller 100, and acquires (or receives) voice data from the voice-recognizing device 12. In this embodiment, the voice-recognizing device 12 applies a well-known technique such as frequency analysis to perform a voice recognition process on the user's voice inputted from a microphone (not shown), and calculates text data corresponding to the voice as voice data.

The voice data calculated by the voice-recognizing device 12 is inputted to the voice-data-receiving unit 22. The voice data can include information on the time of acquisition of the voice used to calculate the voice data.

The voice-data-receiving unit 22 transmits the voice data acquired from the voice-recognizing device 12 to the controller 100. In addition, the voice-data-receiving unit 22 can transmit the acquired voice data to the storage unit 25 (described hereinafter).

The storage unit 25 is connected to the controller 100, and stores the line-of-sight data acquired by the line-of-sight-data-receiving unit 21 and the voice data acquired by the voice-data-receiving unit 22. The storage unit 25 can store the acquired data (line-of-sight data, voice data) for a predetermined time span. Specifically, the stored data can be held in the storage unit 25 for a predetermined time span after being stored, and can be deleted after the elapse of a predetermined time span after storage.

The controller 100 is a general-purpose computer provided with a central processing unit (CPU), a memory, a storage device, an input unit, and the like. The controller 100 is connected to an apparatus group 400, which is the target of control performed by the information processing device 1.

In this embodiment, the apparatus group 400 is a plurality of apparatuses including, for example, a navigation apparatus, a door-lock-controlling apparatus, a window opening/closing control apparatus, a captured image display apparatus, a meter display apparatus, an air-conditioning device, a sunroof, a sunshade, and an audio device. One apparatus specified as a target apparatus to be operated among the apparatus group 400 is controlled according to a signal from the controller 100. For example, the apparatus group 400 is a plurality of apparatuses installed in the vehicle.

A computer program for causing the controller 100 to function as the information processing device 1 is installed in the controller 100. By running the computer program, the controller 100 functions as a plurality of information processing circuits provided to the information processing device 1.

The example given here is one in which a plurality of information processing circuits provided to the information processing device 1 are realized via software; however, as shall be apparent, dedicated hardware for running the information processes described below can be prepared to constitute the information processing circuits. The plurality of information processing circuits can also be configured from individual pieces of hardware.

The controller 100 includes an apparatus-specifying unit 110, a control-command-generating unit 120, and a transmission unit 130 as a plurality of information processing circuits.

Based on the line-of-sight data, the apparatus-specifying unit 110 specifies at least one apparatus among the apparatus group 400, which is a plurality of apparatuses, as a target apparatus to be operated. More specifically, the apparatus-specifying unit 110 can refer to the line-of-sight data to specify an apparatus positioned in the line-of-sight direction as the target apparatus to be operated. A plurality of apparatuses to be operated can be specified from the apparatus group 400, which is a plurality of apparatuses, based on the line-of-sight data.

In addition, the apparatus-specifying unit 110 can refer to the line-of-sight data within a predetermined period to calculate a frequency for each apparatus of the apparatus group 400 and specify an apparatus as the target apparatus to be operated based on the calculated frequency. The term "frequency" calculated for each apparatus means the number of times the line-of-sight direction has been directed toward the apparatus within the predetermined period. In this case, the apparatus having the highest calculated "frequency" can be specified as the target apparatus to be operated.

The apparatus-specifying unit 110 can refer to the line-of-sight data within the predetermined period to calculate a "stoppage time" for each apparatus of the apparatus group 400, and specify an apparatus as the target apparatus to be operated based on the calculated "stoppage time." The "stoppage time" calculated for each apparatus means a time span during which the line-of-sight direction has been continually directed toward the apparatus within the predetermined period. In this case, an apparatus having a calculated "stoppage time" longer than a predetermined threshold value (e.g., 2-5 seconds) can be specified as the target apparatus to be operated, or an apparatus having the longest calculated "stoppage time" can be specified as the target apparatus to be operated.

In addition, the process in which the target apparatus to be operated is specified by the apparatus-specifying unit 110 and the process in which voice data is acquired (received) by the voice-data-receiving unit 22 are in no particular order. In other words, the voice data can be acquired after the target apparatus to be operated has been specified, or the target apparatus to be operated can be specified after the voice data has been acquired.

When the target apparatus to be operated is specified after the voice data has been acquired, the apparatus-specifying unit 110 can specify the target apparatus to be operated based on the line-of-sight direction at a moment in time at which the voice data was inputted, or can specify the target apparatus to be operated based on a line-of-sight direction prior to the moment in time at which the voice data was inputted (e.g., based on the moment in time at which the voice data was inputted, prior by a predetermined time before said moment in time).

Specifically, the apparatus-specifying unit 110 can refer to time information included in the voice data, acquire from the storage unit 25 line-of-sight data corresponding to this time or a time prior to this time, and specify the target apparatus to be operated based on the acquired line-of-sight data.

The apparatus-specifying unit 110 can determine whether or not an target apparatus to be operated can be specified based on the line-of-sight direction at a predetermined moment in time, and specify an target apparatus to be operated based on a line-of-sight direction prior this moment in time when it is determined that an target apparatus to be operated cannot be specified.

Specifically, when it is determined that an target apparatus to be operated cannot be specified based on certain line-of-sight data, the apparatus-specifying unit 110 can refer to time information included in this line-of-sight data, acquire from the storage unit 25 line-of-sight data corresponding to a time prior to this time, and specify an target apparatus to be operated based on the acquired line-of-sight data.

An example of a case in which the apparatus-specifying unit 110 determines it is not possible to specify an target apparatus to be operated is a case in which, for example, there are a plurality of apparatuses that could be specified as a target apparatus to be operated based on a line-of-sight direction included in certain line-of-sight data, and a unique apparatus to be operated cannot be specified from among the apparatus group 400. For example, the line-of-sight direction could be directed near the boundaries of a plurality of adjacent apparatuses.

In such cases, there is a risk that it will not be possible to accurately decide which of the plurality of adjacent apparatuses should be specified as the target apparatus to be operated. The apparatus-specifying unit 110 can then refer to time information included in the line-of-sight data, acquire from the storage unit 25 line-of-sight data corresponding to a time prior to this time, and specify the target apparatus to be operated based on the acquired line-of-sight data.

In the above discussion, it is assumed that the apparatus is present in the line-of-sight direction. In addition, even if the apparatus is not present in the line-of-sight direction, when a predetermined image or icon is present in the line-of-sight direction, the apparatus-specifying unit 110 can specify an apparatus or service associated with the image or icon located in the line-of-sight direction as an apparatus to be operated or a service to be operated.

Even if there is no apparatus, image, or icon in the line-of-sight direction, an apparatus to be operated can be specified when an apparatus to be operated has been associated in advance with an area specified by the line-of-sight direction. For example, an onboard camera installed at the front of the vehicle would be associated in advance with an area outside and in front of the vehicle, and the onboard camera would be specified when the line-of-sight direction is within the area outside and in front of the vehicle.

The control-command-generating unit 120 generates a control command directed at the target apparatus to be operated based on the voice data. The control command generated in the present embodiment is, for example, to enlarge, reduce, rotate, or move an image displayed on the target apparatus to be operated, to lock or unlock the target apparatus to be operated, or the like, and the control command is established beforehand in accordance with the target apparatus to be operated.

The voice data associated with the control command can also be established beforehand; for example, the voice data is data instructing at least one operation among enlarging, reducing, rotating, or moving the image displayed on the target apparatus to be operated, or locking or unlocking the target apparatus to be operated. Multiple pieces of voice data can also be associated with one control command. As an example of this case, multiple pieces of voice data, such as "enlarge," "make bigger," etc., are associated with the control command for enlarging.

For example, when the target apparatus to be operated is a navigation apparatus, the control command is a command such as "enlarge," "reduce," "rotate," or "move" the image displayed on the navigation apparatus. Corresponding to the control command, the voice data is "bigger," "smaller," "rotate (clockwise/counterclockwise)," "up/down/left/right," or the like.

For example, when the target apparatus to be operated is an apparatus that controls locking of a door, the control command is "lock," "unlock," or the like. Corresponding to the control command, the voice data is "close," "open," or the like.

The control-command-generating unit 120 can cancel the target apparatus to be operated when a control command cannot be generated based on voice data. The term "cancel" here means that the target apparatus to be operated specified by the apparatus-specifying unit 110 is treated as a unit that is not a target apparatus to be operated, and the system returns to a state in which none of the apparatuses of the apparatus group 400 have been specified as a target apparatus to be operated.

The transmission unit 130 transmits the control command generated by the control-command-generating unit 120 to the target apparatus to be operated specified by the apparatus-specifying unit 110. The transmission unit 130 can cancel the target apparatus to be operated after the control command has been transmitted to the target apparatus to be operated.

In addition, the notification unit 300 gives a notification via sound or light. More specifically, the user can be notified that voice data is being acquired (or received). For example, the notification unit 300 can use a beep or the like to notify the user that voice data is being received, or can notify the user by having a voice read the name of the specified target apparatus to be operated via a speaker. In addition, the notification unit 300 can notify the user by changes in light, such as blinking, via lamps, displays, or the like provided to each apparatus of the apparatus group 400.

Process Procedure of Information Processing Device

Next, the process procedure of the information processing device 1 according to the present embodiment shall be described with reference to the flowchart of FIG. 2. The process of the information processing device 1 shown in FIG. 2 can be repeatedly executed in a predetermined cycle, or can be executed only when the vehicle is traveling.

Figure 2:
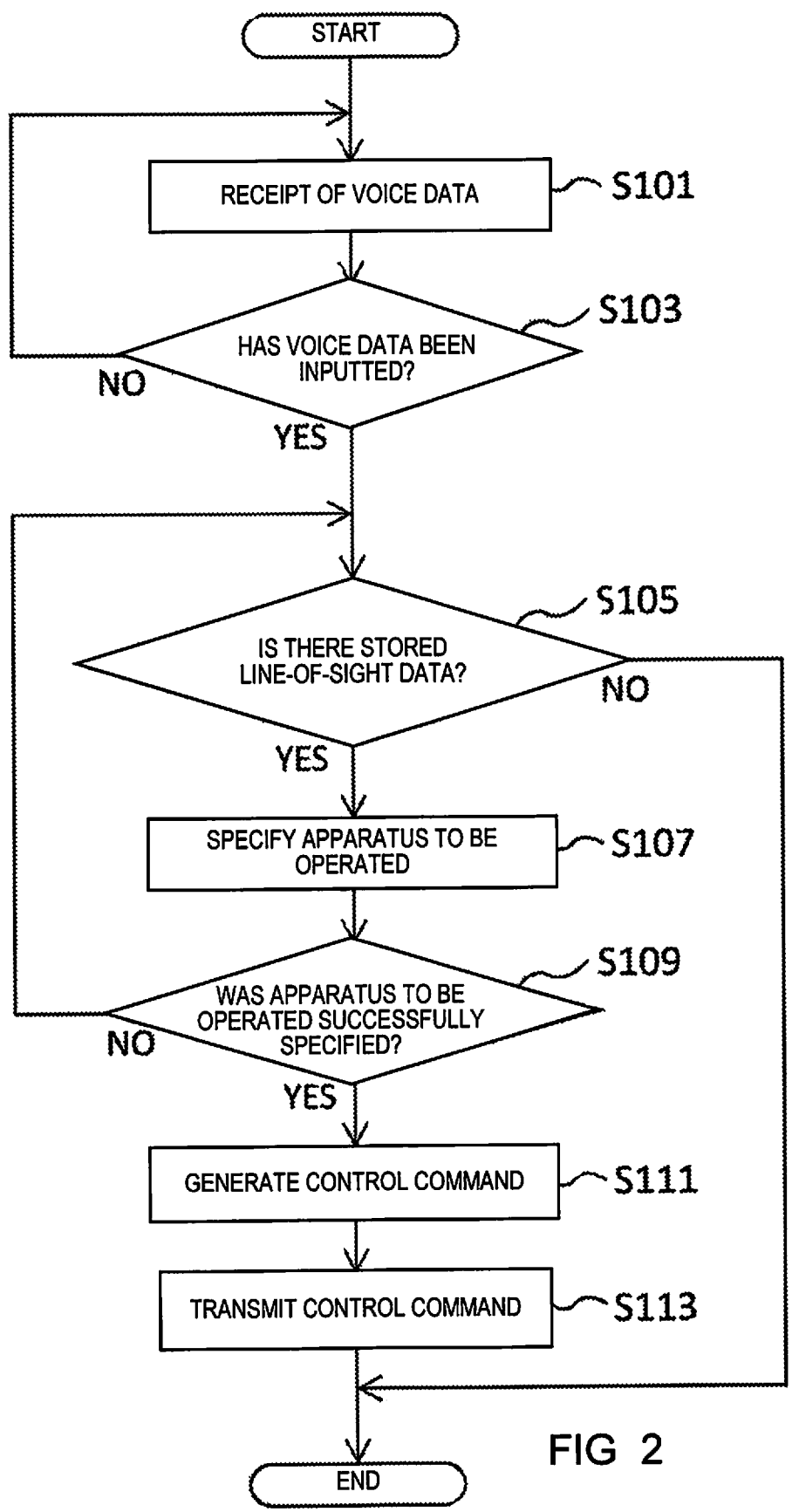
FIG. 2 is a flowchart of the process of the information processing device according to one embodiment of the present invention.

Line-of-sight data can be acquired (or received) and voice data can be acquired (or received) in parallel with the execution of the processes shown in the flowchart of FIG. 2.

First, in step S101, the voice-data-receiving unit 22 acquires (or receives) voice data, and then in step S103, the controller 100 determines whether or not voice data has been inputted.

When it is determined that voice data has not been inputted (NO in step S103), the process returns to step S101.

When it is determined that voice data has been inputted (YES in step S103), in step S105, the controller 100 refers to the storage unit 25 and determines whether or not there is any stored line-of-sight data. Line-of-sight data acquired by the line-of-sight-data-receiving unit 21 is stored at all times in the storage unit 25.

When it is determined that there is no stored line-of-sight data (NO in step S105), the process of FIG. 2 is ended.

When it is determined that there is stored line-of-sight data (YES in step S105), in step S107, the apparatus-specifying unit 110 tests if it is possible to specify at least one apparatus of the apparatus group 400, which is a plurality of apparatuses, as the apparatus to be operated based on one piece of line-of-sight data among the stored line-of-sight data. Alternatively, the apparatus to be operated can be specified based on both the voice data inputted in S101 and the stored line-of-sight data. In step S109, the apparatus-specifying unit 110 determines whether or not an apparatus to be operated was successfully specified.

When it is determined that an apparatus to be operated was not successfully specified (NO in step S109), the process returns to step S105. When the process of step S105 is repeated, the controller 100 determines whether or not there is any other stored line-of-sight data aside from the one piece of line-of-sight data with which an apparatus to be operated was not successfully specified.

When it is determined that an apparatus to be operated was successfully specified (YES in step S109), in step S111, the control-command-generating unit 120 generates a control command directed at the apparatus to be operated based on the voice data inputted in S101 and the apparatus to be operated specified in S109. In step S113, the transmission unit 130 transmits the generated control command to the apparatus to be operated. The process of FIG. 2 is then ended.

An example was given in which in the configuration described above, when a control command is generated for an apparatus to be operated, the apparatus to be operated is always specified based on line-of-sight data, but this example is not provided by way of limitation.

For example, the configuration can be such that in S103, when voice data is inputted, a determination is made as to whether or not an apparatus to be operated can be specified and a control command directed at the apparatus to be operated can be generated from the voice data, and then (1) when an apparatus to be operated can be specified and a control command directed at the apparatus to be operated can be generated based on the inputted voice data, the process advances to S113 and the control command is transmitted to the apparatus to be operated, and (2) when an apparatus to be operated cannot be specified and a control command directed at the apparatus to be operated cannot be generated based on the inputted voice data, the process advances to the steps of S105 and thereafter. In this case, when an apparatus to be operated cannot be specified and a control command directed at the apparatus to be operated cannot be generated according to voice data, the apparatus to be operated would be specified based on line-of-sight data.

Effects of Embodiment

As was described in detail above, in the information-processing device and information-processing method according to the present embodiment, line-of-sight data pertaining to the direction of a user's line of sight is stored, and when voice data has been acquired, an apparatus to be operated is specified from a plurality of apparatuses based on the stored line-of-sight data, a control command directed at the apparatus to be operated is generated based on the voice data, and the control command is transmitted to the apparatus to be operated.

It is thereby possible to specify a unique apparatus to be operated and reduce the possibility that the apparatus will be operated incorrectly. In addition, because the apparatus to be operated is specified based on line-of-sight data, there is no need for the user to vocally designate an apparatus to be operated, and the user's utterances can be shortened. As a result, user convenience can be improved.

Because the apparatus to be operated is specified using line-of-sight data, the calculation cost required to specify the apparatus to be operated in voice recognition can be reduced to less than when operation is performed based on voice data alone. Recognition errors in voice recognition are prevented, and the possibility of incorrect operation can be reduced.

Because the user can operate the apparatus to be operated merely by looking at the apparatus and uttering a word relating to the apparatus, there is no need to remember the positions or placement of buttons for operating the apparatuses. Furthermore, there is no need for the user to move their upper arm or hand to touch buttons for operating the apparatuses. As a result, the complexity of the operation can be reduced.

Specifying an apparatus to be operated and shortening user utterances shall be described with an example. For example, when the apparatus group 400 includes an "audio apparatus" and an "air-conditioning device," the particular apparatus to operate cannot be specified merely with the word "increase" or "decrease."

However, when the user has visually confirmed the "audio apparatus" before saying "turn up/turn down," the "audio apparatus" is specified as the apparatus to be operated, and a control command to "turn up the volume of the audio apparatus" or "turn down the volume of the of audio apparatus" is generated. As a result, even if the "audio apparatus" is not vocally designated, an operation will not be performed relating to the "air-conditioning device." Therefore, the possibility of incorrect operation can be reduced.

Conversely, when the user has visually confirmed the "air-conditioning device" before saying "increase" or "decrease," the "air-conditioning device" is specified as the target apparatus to be operated, and a control command to "increase temperature of air-conditioning device" or "decrease temperature of air-conditioning device" is generated. As a result, even if the "air-conditioning device" is not vocally designated, an operation is not performed relating to the "audio apparatus." Therefore, the possibility of incorrect operation can be reduced.

In addition, for example, when the apparatus group 400 includes a "navigation apparatus," a "captured image display apparatus," and a "meter display apparatus," the particular apparatus to operate cannot be specified merely with the word "enlarge," "reduce," "rotate," or "move." In this case as well, due to the user visually confirming the intended apparatus before saying "enlarge," "reduce," "rotate," or "move," the visually confirmed apparatus will be specified as the apparatus to be operated and a control command corresponding to the word will be generated. Therefore, the possibility of incorrect operation can be reduced.

In the information-processing device and the information-processing method according to the present embodiment, the apparatus to be operated can be specified based on the line-of-sight direction at the moment in time at which voice data was inputted. The user can thereby designate the apparatus to be operated merely by visually confirming the apparatus that is to be operated at the moment in time of the speech. As a result, the complexity of the operation can be reduced.

Furthermore, in the information-processing device and the information-processing method according to the present embodiment, an apparatus to be operated can be specified based on a past line-of-sight direction prior to the moment in time at which voice data was inputted. The user can thereby designate the apparatus to be operated merely by visually confirming the apparatus that is to be operated immediately before speaking. As a result, the complexity of the operation can be reduced.

In addition, in the information-processing device and the information-processing method according to the present embodiment, an apparatus to be operated can be specified based on a past line-of-sight direction prior by a predetermined time span to the moment in time at which voice data was inputted. The user can thereby designate the apparatus to be operated merely by visually confirming the apparatus that is to be operated immediately before speaking. As a result, the complexity of the operation can be reduced. In particular, a process is performed that is directed solely at the visual confirmation made by the user during the predetermined time span prior to the moment in time of the speech, and the possibility of incorrect operation can be reduced.

Furthermore, in the information-processing device and the information-processing method according to the present embodiment, when it is determined that an apparatus to be operated cannot be specified based on the line-of-sight direction at the moment in time at which voice data was inputted, an apparatus to be operated can be specified based on a past line-of-sight direction prior to the moment in time at which voice data was inputted. Due to this feature, there is no need for the user to utter the specific nature of the operation directed at the apparatus that is to be operated at the same time that the user visually confirms the apparatus, and the complexity of the operation can be reduced.

In addition, in the information-processing device and the information-processing method according to the present embodiment, when it is determined that there are a plurality of apparatuses that could be specified as an apparatus to be operated based on a line-of-sight direction, an apparatus to be operated could be specified based on the line-of-sight direction registered at a moment in time prior to a current line-of-sight direction. It is thereby possible to specify an apparatus to be operated by detecting when the user is facing in a visual confirmation direction with which a unique apparatus to be operated can be specified, while the user is facing in various visual confirmation directions. As a result, the user does not need to gaze in a particular visual confirmation direction. In addition, the complexity of the operation can be reduced.

Furthermore, in the information-processing device and the information-processing method according to the present embodiment, when an apparatus to be operated cannot be specified from a plurality of apparatuses based on voice data, an apparatus to be operated can be specified based on line-of-sight data. Due to this feature, there is a greater possibility of specifying an apparatus to be operated, and the complexity of the operation can be reduced.

Furthermore, in the information-processing device and the information-processing method according to the present embodiment, an apparatus located in the line-of-sight direction can be specified as an apparatus to be operated. The user can thereby designate an apparatus to be operated merely by visually confirming an apparatus that is to be operated. As a result, the complexity of the operation can be reduced.

In addition, in the information-processing device and the information-processing method according to the present embodiment, the frequency with which an apparatus is positioned in the line-of-sight direction can be calculated and the apparatus can be specified as the apparatus to be operated based on this frequency. It is thereby possible to detect when the user intentionally visually confirms the apparatus that is to be operated. As a result, the possibility of incorrect operation can be reduced, and furthermore, the complexity of the operation can be reduced.

Furthermore, in the information-processing device and the information-processing method according to the present embodiment, the time span during which an apparatus is positioned in the line-of-sight direction can be calculated and the apparatus can be specified as the apparatus to be operated based on this time span. It is thereby possible to detect when the user intentionally visually confirms the apparatus that is to be operated. As a result, the possibility of incorrect operation can be reduced, and furthermore, the complexity of the operation can be reduced.

In addition, in the information-processing device and the information-processing method according to the present embodiment, the apparatuses can include at least one of the following: a navigation apparatus, a door-lock-controlling apparatus, a window-opening/closing-controlling apparatus, a captured-image-displaying apparatus, a meter-displaying apparatus, an air-conditioning device, a sunroof, a sunshade, and an audio device.

Because the user can operate an apparatus that is to be operated among these apparatuses merely by visually confirming the apparatus and issuing an utterance relating to the apparatus, there is no need for the user to remember the positions or placement of buttons for operating the apparatuses. Furthermore, there is no need for the user to move their upper arm or hand to touch buttons for operating the apparatuses. As a result, the complexity of the operation can be reduced.

Furthermore, in the information-processing device and the information-processing method according to the present embodiment, the control command can be to enlarge, reduce, rotate, or move an image displayed on the apparatus to be operated, or to lock or unlock the apparatus to be operated. User convenience can be improved because a control command corresponding to the apparatus to be operated is automatically generated based on voice data.

In addition, in the information-processing device and the information-processing method according to the present embodiment, the voice data can be data instructing at least one of the following: to enlarge, reduce, rotate, or move an image displayed on the apparatus to be operated, or to unlock or lock the apparatus to be operated. Because a control command is generated using voice data corresponding to the apparatus to be operated, there is no need for the user to vocally designate an apparatus to be operated when an apparatus to be operated has been specified, and the speech of the user can be shortened. As a result, user convenience can be improved.

The functions explained in the above embodiment could be carried out by one or more processing circuits. Processing circuits include programmed processors and electrical circuits, as well as devices such as application-specific integrated circuits (ASICs), and circuitry arranged so as to execute the functions described.

The particulars of the present invention were described above according to the embodiment, but are not provided by way of limitation on the present invention; it would be obvious to a person skilled in the art that various modifications and improvements can be made. The discussion and drawings constituting part of this disclosure should not be understood as limiting the present invention. Various alternative embodiments, examples, and operational features shall be clear to those skilled in the art from this disclosure.

As shall be apparent, the present invention includes, inter alia, various embodiments not disclosed in the description. Therefore, the technical scope of the present invention is defined only by the matters specifying the invention according to the valid scope of claims based on the above description.

The invention claimed is:

1. An information processing device comprising:
   a line-of-sight detecting device arranged to receive image data from a camera arranged and configured to capture image data of a user's face, the line-of-sight detecting device being configured to generate line-of-sight data indicating a line-of-sight direction of the user;
   a storage device configured to store the line-of-sight data in association with time;
   a voice-data-receiving unit configured for inputting voice data from the user; and
   a controller,
   the controller being configured to
      determine whether a target apparatus to be operated can be specified based on the voice data;
      refer to time information included in the voice data;
      acquire one piece of line-of-sight data among the line-of-sight data, the one piece of line-of-sight data corresponding to a specific time indicated by the time information or a time prior to the specific time;
      specify the target apparatus based on the one piece of line-of-sight data upon determining that the target apparatus cannot be specified based on the voice data,
      generate a control command directed at the target apparatus based on the voice data, and
      control the target apparatus based on the control command.

2. The information processing device according to claim 1, wherein
   the one piece of line-of-sight information corresponds to the specific time, and the specific time indicates a moment in time at which the voice data was inputted.

3. The information processing device according to claim 1, wherein
   the one piece of line-of-sight information corresponds to the time prior to the specific time, and the time prior to the specific time is prior to a moment in time at which the voice data was inputted.

4. The information processing device according to claim 3, wherein the time prior to the specific time is prior to to the moment in time at which the voice data was inputted by a predetermined time span.

5. The information processing device according to claim 1, wherein
the one piece of line-of-sight information corresponds to the specific time, the specific time indicating a moment in time at which the voice data was inputted, and
the controller specifies the target apparatus based on another piece of line-of-sight data corresponding to the time prior to the specific time upon the controller determining that the target apparatus cannot be specified based on the line-of-sight corresponding to the specific time.

6. The information processing device according to claim 5, wherein
the controller is configured to specify the target apparatus based on the other piece of line-of-sight data upon the controller determining that using the one piece of line-of-sight data results in more than one of a plurality of apparatuses being specified as the target apparatus.

7. The information processing device according to claim 1, wherein
the controller is configured to specify the target apparatus from a plurality of apparatuses.

8. The information processing device according to claim 1, wherein
the controller is configured to specify an apparatus positioned in the line-of-sight direction indicated by the one piece of line-of-sight data as the target apparatus to be operated.

9. The information processing device according to claim 1, wherein
the controller is configured to calculate a frequency with which an apparatus is positioned in the line-of-sight direction indicated by the one piece of line-of-sight data, and is configured to specify the apparatus as the target apparatus based on the frequency.

10. The information processing device according to claim 1, wherein
the controller is configured to calculate a time span in which an apparatus is positioned in the line-of-sight direction, and is configured to specify the apparatus as the target apparatus based on the time span.

11. The information processing device according to claim 1, wherein
the target apparatus is specified from among at least one of the following: a navigation apparatus, a door-lock-controlling apparatus, a window opening/closing control apparatus, a captured image display apparatus, a meter display apparatus, an air-conditioning device, a sunroof, a sunshade, and an audio device.

12. The information processing device according to claim 1, wherein
the control command is to enlarge, reduce, rotate, or move an image displayed on the target apparatus, or to unlock or lock the target apparatus.

13. The information processing device according to claim 1, wherein
the voice data is data used to enlarge, reduce, rotate, or move an image displayed on the target apparatus, or unlock or lock the target apparatus.

14. An information processing method comprising:
capturing image data of a user's face using a camera;
using the image data to generate line-of-sight data indicating a line-of-sight direction of the user;
storing the line-of-sight data in association with time;
receiving an input of voice data from the user; and
using a controller to
determine whether a target apparatus to be operated can be specified based on the voice data,
refer to time information included in the voice data,
acquire one piece of line-of-sight data among the line-of-sight data, the one piece of line-of-sight data corresponding to a specific time indicated by the time information or a time prior to the specific time,
specify the target apparatus based on the one piece of line-of-sight data upon determining that the target apparatus cannot be specified based on the voice data;
generate a control command directed at the target apparatus to be operated based on the voice data; and
control the target apparatus based on the control command.

* * * * *